United States Patent
Zheng et al.

(10) Patent No.: US 12,144,051 B2
(45) Date of Patent: Nov. 12, 2024

(54) INFORMATION SENDING METHOD, INFORMATION RECEIVING METHOD, TERMINAL, AND NETWORK DEVICE

(71) Applicant: VIVO MOBILE COMMUNICATION CO., LTD., Guangdong (CN)

(72) Inventors: Qian Zheng, Guangdong (CN); Wei Bao, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 390 days.

(21) Appl. No.: 17/479,092

(22) Filed: Sep. 20, 2021

(65) Prior Publication Data

US 2022/0015179 A1    Jan. 13, 2022

Related U.S. Application Data

(63) Continuation of application No. PCT/CN2020/080363, filed on Mar. 20, 2020.

(30) Foreign Application Priority Data

Mar. 22, 2019 (CN) .......................... 201910223631.2

(51) Int. Cl.
H04W 76/20 (2018.01)
H04W 24/10 (2009.01)

(52) U.S. Cl.
CPC ........... *H04W 76/20* (2018.02); *H04W 24/10* (2013.01)

(58) Field of Classification Search
CPC .............................. H04W 76/20; H04W 24/10

USPC ......................................................... 370/328
See application file for complete search history.

(56) References Cited

U.S. PATENT DOCUMENTS

| | | | |
|---|---|---|---|
| 2019/0037425 A1 | 1/2019 | Hong et al. | |
| 2019/0150014 A1* | 5/2019 | Virtej | H04W 76/27 370/329 |
| 2020/0128422 A1* | 4/2020 | Kim | H04W 36/0069 |
| 2020/0229053 A1 | 7/2020 | Pakniat et al. | |
| 2021/0392537 A1 | 12/2021 | Da Silva et al. | |

FOREIGN PATENT DOCUMENTS

| | | |
|---|---|---|
| CN | 109309969 A | 2/2019 |
| CN | 109391998 A | 2/2019 |
| EP | 3264809 A1 | 1/2016 |

(Continued)

OTHER PUBLICATIONS

Huawei, Hisilicon, "IDLE Mode Measurement Reporting message", 3GPP TSG-RAN WG2 Meeting #101, R2-1802669, Athens, Greece, Feb. 26-Mar. 2, 2018.

(Continued)

*Primary Examiner* — Gbemileke J Onamuti
(74) *Attorney, Agent, or Firm* — Price Heneveld LLP

(57) ABSTRACT

This application provides an information sending method, an information receiving method, a terminal, and a network device. The information sending method includes: receiving request information from a network device; and sending early measurement information to the network device, where the request information is used to request the terminal to feed back an early measurement result; and the request information is received and the early measurement information is sent during an RRC connection resume procedure.

15 Claims, 5 Drawing Sheets

(56) References Cited

FOREIGN PATENT DOCUMENTS

| JP | 2020530689 A | 10/2020 |
| WO | 2018236172 A1 | 12/2018 |
| WO | 2019032037 A1 | 2/2019 |

OTHER PUBLICATIONS

Nokia, "Running CR for euCA Stage-2", 3GPP TSG-RAN WG2 Meeting #101, R2-1806245 R2-1806788, Sanya, China, Apr. 16-20, 2018.
Nokia, "Running CR for euCA Stage-2", 3GPP TSG-RAN WG2 Meeting #101, R2-1806788, Sanya, China, Apr. 16-20, 2018.
Noka, "Stage-2 description of euCA", 3GPP TSG-RAN WG2 Meeting #102, R2-1809245, Busan, South Korea, May 21-25, 2018.
Huawei, Hisilicon, "Discussion on inter-frequency measurements in idle mode for euCA", 3GPP TSG-RAN WG4 Meeting #86, R4-1802631, Athens, Greece, Feb. 26-Mar. 2, 2017.
Ericsson, "Signalling of early measurements for CA/DC setup", 3GPP TSG-RAN WG2 #105, R2-1900693, Athens, Greece, Feb. 25-Mar. 1, 2019.
Qualcomm Inc., "Supporting early measurement reporting in NR", 3GPP TSG-RAN WG2 Meeting #105, R2-1900104, Athens, Greece, Feb. 25-Mar. 1, 2019.
LG Electronics, "Reporting condition of IDLE measurements", 3GPP TSG-RAN WG2 Meeting #101bis, R2-1804993, Sanya, China, Apr. 16-20, 2018.

\* cited by examiner

INFORMATION SENDING METHOD, INFORMATION RECEIVING METHOD, TERMINAL, AND NETWORK DEVICE

CROSS-REFERENCE TO RELATED APPLICATIONS

This application is a continuation application of PCT International Application No. PCT/CN2020/080363 filed on Mar. 20, 2020, which claims priority to Chinese Patent Application No. 201910223631.2, filed in China on Mar. 22, 2019, both disclosures of which are incorporated herein by reference in their entireties.

TECHNICAL FIELD

This disclosure relates to the field of communications technologies, and in particular, to an information sending method, an information receiving method, a terminal, and a network device.

BACKGROUND

Currently, fast carrier activation and deactivation functions are introduced for enhanced utilization of carrier aggregation (enhanced utilization of carrier aggregation, EuCA) in long term evolution (Long Term Evolution, LTE) R15. To implement such functions, a terminal such as user equipment (User Equipment, UE) needs to perform measurement in advance in an idle state (Idle state) or a radio resource control (Radio Resource Control, RRC) suspended state and report the measurement.

However, for early measurement reporting in an existing EuCA framework, the UE can report an available measurement result to a network device no sooner than an RRC connection is resumed and the UE successfully enters an RRC connected state. Consequently, a requirement of quickly activating relevant configuration by the network device cannot be satisfied, for example, a requirement of quickly activating carrier aggregation (Carrier Aggregation, CA) configuration and/or dual connectivity (Dual Connectivity, DC) configuration by the network device cannot be satisfied.

SUMMARY

Embodiments of this disclosure provide an information sending method, an information receiving method, a terminal, and a network device, to resolve a problem that a measurement reporting occasion for an existing terminal cannot meet a requirement of quickly activating related configuration by the network device.

To resolve the foregoing technical problem, the embodiments of this disclosure are implemented as follows:

According to a first aspect, an embodiment of this disclosure provides an information sending method, applied to a terminal and including:
receiving request information from a network device; and
sending early measurement information to the network device, where the request information is used to request the terminal to feed back an early measurement result; and
the request information is received and the early measurement information is sent during a radio resource control RRC connection resume procedure.

According to a second aspect, an embodiment of this disclosure provides an information sending method, applied to a network device and including:
sending request information to a terminal; and
receiving early measurement information from the terminal, where
the request information is used to request the terminal to feed back an early measurement result; and the request information is sent and the early measurement information is received during an RRC connection resume procedure.

According to a third aspect, an embodiment of this disclosure provides a terminal, including:
a first receiving module, configured to receive request information from a network device; and
a first sending module, configured to send early measurement information to the network device, where
the request information is used to request the terminal to feed back an early measurement result; and the request information is received and the early measurement information is sent during an RRC connection resume procedure.

According to a fourth aspect, an embodiment of this disclosure provides a network device, including:
a second sending module, configured to send request information to a terminal; and
a second receiving module, configured to receive early measurement information from the terminal, where
the request information is used to request the terminal to feed back an early measurement result; and the request information is sent and the early measurement information is received during an RRC connection resume procedure.

According to a fifth aspect, an embodiment of this disclosure provides a terminal, including: a memory, a processor, and a program stored in the memory and capable of running on the processor, where when the program is executed by the processor, the steps of the information sending method applied to the terminal are implemented.

According to a sixth aspect, an embodiment of this disclosure provides a network device, including: a memory, a processor, and a program stored in the memory and capable of running on the processor, where when the program is executed by the processor, the steps of the information receiving method applied to the network device are implemented.

According to a seventh aspect, an embodiment of this disclosure provides a computer-readable storage medium, where the computer-readable storage medium stores a program, and when the program is executed by a processor, the steps of the information sending method applied to the terminal are implemented, or the steps of the information receiving method applied to the network device are implemented.

In the embodiments of this disclosure, the request information is received from the network device; and the early measurement information is sent to the network device, where the request information is used to request the terminal to feed back the early measurement result; and the request information is received and the early measurement information is sent during the RRC connection resume procedure. Reporting of the measurement result may be completed during the RRC connection resume procedure, thereby further advancing the measurement reporting occasion of the terminal compared with the related art, and meeting the requirement of the network device to quickly activate the related configuration, for example, a requirement of quickly activating CA configuration and/or DC configuration by the network device.

BRIEF DESCRIPTION OF DRAWINGS

To describe the technical solutions in the embodiments of this disclosure more clearly, the following briefly describes the accompanying drawings required in the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

Figure 1:
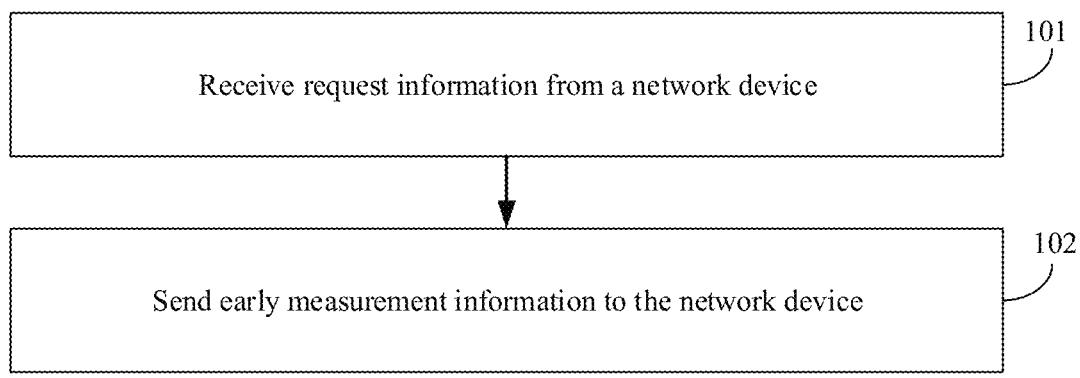
FIG. 1 is a flowchart of an information sending method according to an embodiment of this disclosure.

To describe the technical solutions in the embodiments of this disclosure more clearly, the following briefly describes the accompanying drawings required in the embodiments of this disclosure. Apparently, the accompanying drawings in the following description show merely some embodiments of this disclosure, and persons of ordinary skill in the art may derive other drawings from these accompanying drawings without creative efforts.

The technologies described herein are not limited to a long term evolution (Long Time Evolution, LTE)/LTE-Advanced (LTE-Advanced, LTE-A) system, and are also applicable to various wireless communications system, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" are often used interchangeably. The CDMA system may implement radio technologies such as CDMA2000 and universal terrestrial radio access (Universal Terrestrial Radio Access, UTRA). UTRA includes wideband CDMA (Wideband Code Division Multiple Access, WCDMA) and other CDMA variants. The TDMA system may implement radio technologies such as global system for mobile communications (Global System for Mobile Communications, GSM). The OFDMA system may implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are part of the universal mobile telecommunications system (Universal Mobile Telecommunications System, UMTS). LTE and more advanced LTE (such as LTE-A) are new UMTS versions using E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies. However, the following describes a new radio (New Radio, NR) system for purpose of illustration, and uses NR terminology in most of the following description. Persons skilled in the art can understand that the embodiments are only examples and constitute no limitation, and the technical solutions in the embodiments of this disclosure are also applicable to applications other than NR system applications.

The wireless communications system in the embodiments of this disclosure includes a terminal and a network device. The terminal may also be referred to as a terminal device or user equipment (User Equipment, UE). The terminal may be a terminal side device such as a mobile phone, a tablet computer (Tablet Computer), a laptop computer (Laptop Computer), a personal digital assistant (Personal Digital Assistant, PDA), a mobile internet device (Mobile Internet Device, MID), a wearable device (Wearable Device), or an in-vehicle device. It should be noted that the specific type of the terminal is not limited in the embodiments of this disclosure. The network device may be a base station or a core network, where the base station may be a base station of 5G or a later version (for example, gNB or 5G NR NB), or a base station in another communications system (for example, an eNB, a WLAN access point, or another access points). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a home NodeB, a home evolved NodeB, a WLAN access point, a Wi-Fi node, or some other appropriate terms in the art. As long as the same technical effect is achieved, the base station is not limited to a specific technical term.

This disclosure is described in detail below with reference to the embodiments and the accompanying drawings.

Referring to FIG. 1, FIG. 1 is a flowchart of an information sending method according to an embodiment of this disclosure. The method is applied to a terminal. As shown in FIG. 1, the method includes the following steps 101 and 102.

Step 101: Receive request information from a network device.

The request information is used to request the terminal to feed back an early measurement result, that is, to initiate an early measurement result request to the terminal. Specific scenarios to which the embodiments of this disclosure are applicable are mainly related to a terminal with an RRC suspended connection (RRC suspended connection) in LTE. For example, a terminal enters an RRC connection suspended state after receiving an RRC connection release message from the network device. Alternatively, the specific scenarios to which the embodiments of this disclosure are applicable are mainly related to a terminal in an RRC inactive state (RRC Inactive state) in NR. For example, a terminal enters the RRC inactive state after receiving an RRC release message from the network device.

Step 102: Send early measurement information to the network device.

The request information is received and the early measurement information is sent during an RRC connection resume procedure. During specific implementation, the foregoing early measurement information may optionally be an available measurement result (that is, an early measurement result) or indication information, where the indication information is used to indicate no available measurement result.

In the information sending method in this embodiment of this disclosure, reporting of the measurement result may be completed during an RRC connection resume procedure, thereby further advancing a measurement reporting occasion of the terminal compared with the related art, and meeting a requirement of quickly activating related configuration by the network device, for example, a requirement of quickly activating CA configuration and/or DC configuration by the network device.

In this embodiment of this disclosure, optionally, the request information is received through either of the following messages:
  an RRC connection resume message, where, for example, an extended field in the RRC connection resume message is used to carry the request information; and
  another downlink RRC message used together with the RRC connection resume message, where the downlink RRC message may be a reused UE information request (UEInformationRequest) message, or may be a newly added RRC message compared with the related art, and this is not limited in this embodiment of this disclosure.

Optionally, a measurement type of a measurement result requested in the request information includes at least one of the following:
  per-cell, per-beam, and a specified radio access type (Radio Access Type, RAT).

It can be understood that the specified RAT may optionally be at least one of LTE or NR.

Optionally, the early measurement information is sent through either of the following messages:
  an RRC connection resume complete message, where, for example, an extended field in the RRC connection resume complete message is used to carry the early measurement information; and
  another uplink RRC message used together with the RRC connection resume complete message, where the uplink RRC message may be a reused UE information response (UEInformationResponse) message, or may be a newly added RRC message compared with the related art, and this is not limited in this embodiment of this disclosure.

In this embodiment of this disclosure, under the condition of no available measurement result, the early measurement information may optionally be indication information and the indication information is used to indicate:
  no available (no available) measurement result.

Further, the indication information is further used to indicate:
  a measurement type with respect to an unavailable measurement result; where
  the measurement type includes at least one of the following:
  per-cell, per-beam, and a specified RAT.

In addition, under the condition that there is no available measurement result, the RRC connection resume complete message may also implicitly indicate the early measurement information, that is, no available measurement result. In other words, the RRC connection resume complete message does not include information related to the early measurement result, and the RRC connection resume complete message is used to implicitly indicate no available measurement result.

In this embodiment of this disclosure, under the condition that there is an available measurement result, the early measurement information includes at least one of the following:
  an available per-cell measurement result;
  an available per-beam measurement result;
  an available measurement result for a specified RAT;
  an available per-cell measurement result for a specified RAT; or
  an available per-beam measurement result for a specified RAT.

It should be noted that a meaning of "being available" in this embodiment may be that a corresponding measurement result exceeds a preset threshold, and the preset threshold may optionally be at least one of the following: a preset reference signal received power (Reference Signal Received Power, RSRP) threshold, a preset reference signal received quality (Reference Signal Received Quality, RSRQ) threshold, or a preset reference signal strength indicator (Reference Signal Strength Indicator, RSSI) threshold.

Figure 2:
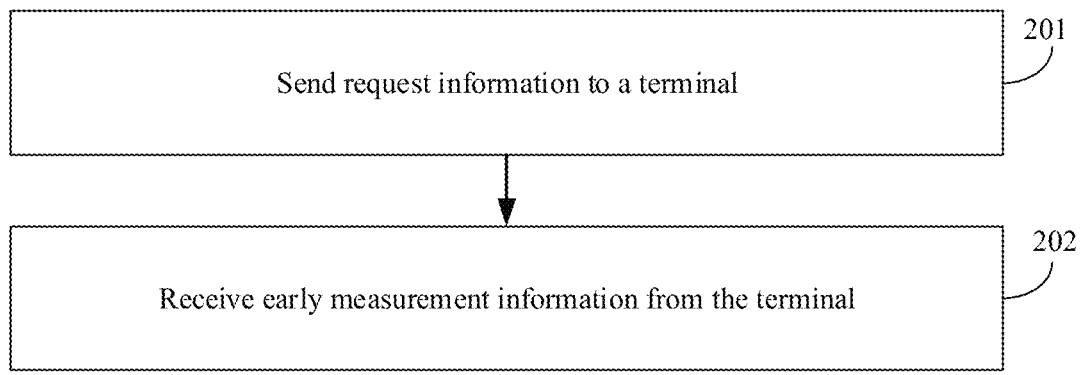
FIG. 2 is a flowchart of an information receiving method according to an embodiment of this disclosure.

Referring to FIG. 2, FIG. 2 is a flowchart of an information receiving method according to an embodiment of this disclosure. The method is applied to a network device, and as shown in FIG. 2, the method includes the following steps 201 and 202.

Step 201: Send request information to a terminal.

The request information is used to request the terminal to feed back an early measurement result.

Step 202: Receive early measurement information from the terminal.

The request information is sent and the early measurement information is received during an RRC connection resume procedure.

In the information receiving method in this embodiment of this disclosure, a measurement reporting occasion of the terminal can be further advanced compared with the related art, thereby meeting a requirement of quickly activating related configuration by the network device, for example, a requirement of quickly activating CA configuration and/or DC configuration by the network device.

In this embodiment of this disclosure, optionally, the request information is sent through either of the following messages:
  an RRC connection resume message; and
  another downlink RRC message used together with the RRC connection resume message.

Optionally, a measurement type of a measurement result requested in the request information includes at least one of the following:
  per-cell, per-beam, and a specified RAT.

Optionally, the early measurement information is received through either of the following messages:
  an RRC connection resume complete message; and
  another uplink RRC message used together with the RRC connection resume complete message.

Optionally, the early measurement information is indication information, and the indication information is used to indicate:
  no available measurement result.

Optionally, the indication information is further used to indicate: a measurement type with respect to an unavailable measurement result; where the measurement type includes at least one of the following:

per-cell, per-beam, and a specified RAT.

Optionally, the early measurement information includes at least one of the following:

an available per-cell measurement result;
an available per-beam measurement result;
an available measurement result for a specified RAT;
an available per-cell measurement result for a specified RAT; or
an available per-beam measurement result for a specified RAT.

Optionally, the RRC connection resume complete message does not include information related to the early measurement result, and the RRC connection resume complete message is used to implicitly indicate no available measurement result.

Figure 3:
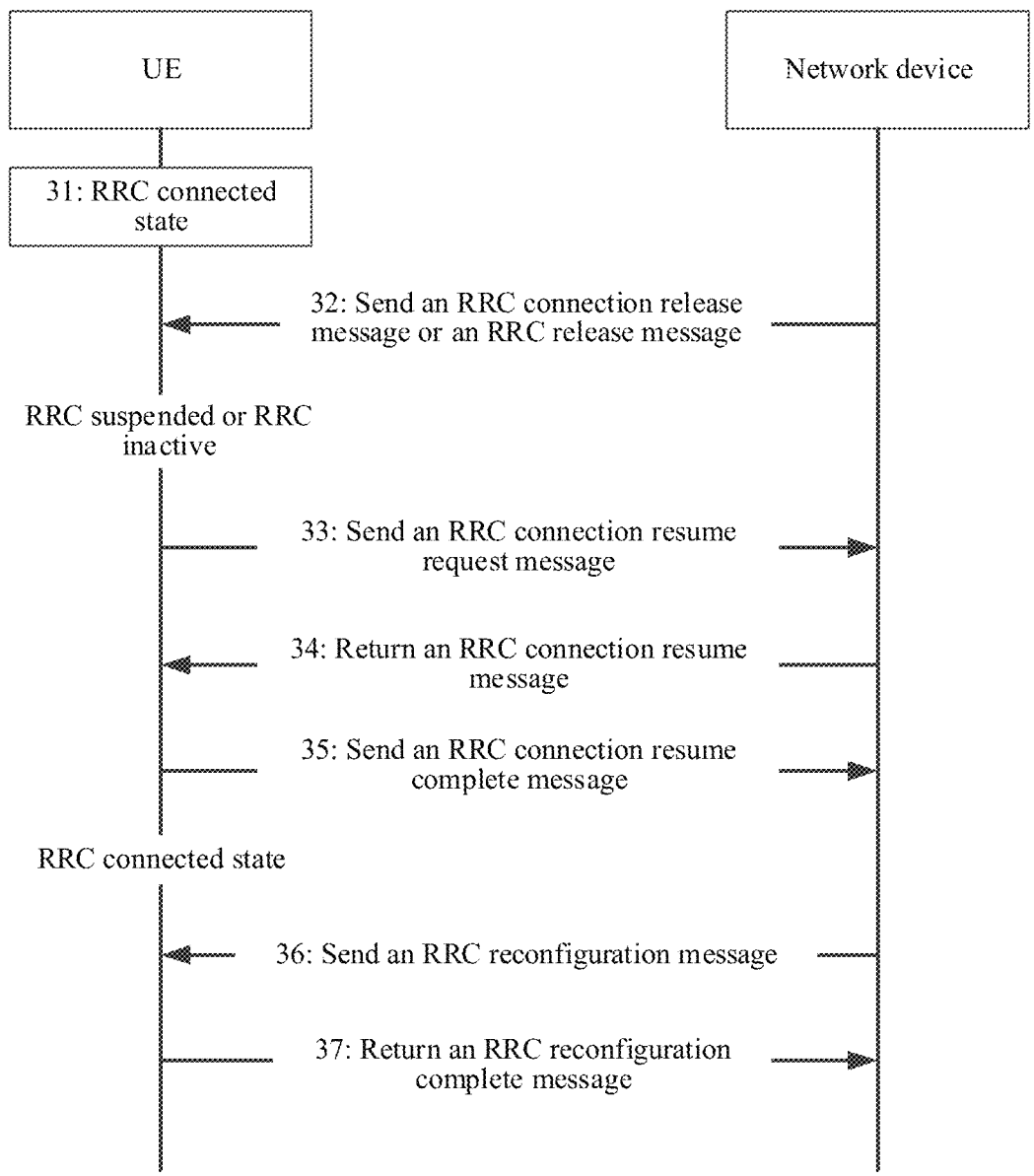
FIG. 3 is a flowchart of a measurement reporting process according to an embodiment of this disclosure.

The following describes a measurement reporting process in an embodiment of this disclosure with reference to FIG. 3.

As shown in FIG. 3, the measurement reporting process in this embodiment of this disclosure mainly includes the following steps 31 to 37.

Step 31: UE is in an RRC connected (RRC Connected) state.

Step 32: A network device sends an RRC connection release (RRCConnectionRelease) message to the UE to make the UE enter an RRC suspended connection (RRC suspended connection) state, or sends an RRC release (RRCRelease) message to the UE to make the UE enter an RRC inactive (inactive) state and start measurement.

Step 33: The UE initiates an RRC connection resume procedure, and sends an RRC connection resume request message to the network device.

Step 34: The network device returns an RRC connection resume message to the UE.

Optionally, the request information may be carried in the RRC connection resume message or another downlink RRC message used together with the RRC connection resume message, to request the UE to feed back the early measurement result, that is, to initiate an early measurement result request to the UE.

Step 35: The UE resumes an RRC connection based on the RRC connection resume message, and sends an RRC connection resume complete message to the network device.

Under the condition that there is no available measurement result, the indication information may be carried in the RRC connection resume complete message or another uplink RRC message used together with the RRC connection resume complete message, to indicate no available measurement result.

Alternatively, under the condition that there is no available measurement result, the RRC connection resume complete message does not carry any information related to the early measurement result, to implicitly indicate no available measurement result.

Alternatively, under the condition that there is an available measurement result, an available measurement result may be carried in the RRC connection resume complete message or another uplink RRC message used together with the RRC connection resume complete message.

Step 36: The network device sends an RRC reconfiguration (RRCReconfiguration) message to the UE based on a measurement result reported by the UE, to quickly configure and activate a CA and/or DC carrier of the UE.

Step 37: The UE returns an RRC reconfiguration complete (RRCReconfigurationComplete) message to the network device.

In this way, reporting of the measurement result is completed during an RRC connection resume procedure, thereby further advancing a measurement reporting occasion of the terminal compared with the related art, and meeting a requirement of quickly activating related configuration by the network device.

The foregoing embodiments describe the information sending method and information receiving method in this disclosure, and the following describes a terminal and a network device in this disclosure with reference to the embodiments and accompanying drawings.

Figure 4:
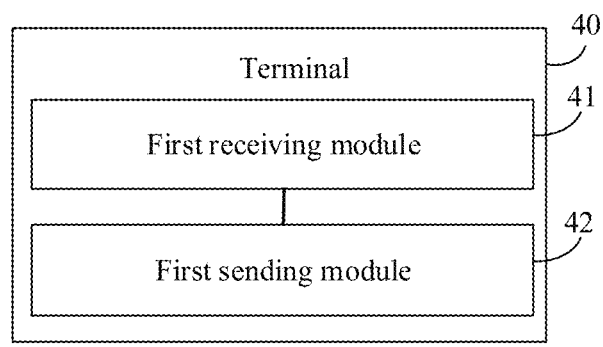
FIG. 4 is a first schematic structural diagram of a terminal according to an embodiment of this disclosure.

Referring to FIG. 4, FIG. 4 is a schematic structural diagram of a terminal according to an embodiment of this disclosure. As shown in FIG. 4, the terminal 40 includes:

a first receiving module 41, configured to receive request information from a network device; and a first sending module 42, configured to send early measurement information to the network device, where the request information is used to request the terminal to feed back an early measurement result; and the request information is received and the early measurement information is sent during an RRC connection resume procedure.

In this embodiment, reporting of the measurement result may be completed during an RRC connection resume procedure, thereby further advancing a measurement reporting occasion of the terminal compared with the related art, and meeting a requirement of quickly activating related configuration by the network device.

In this embodiment of this disclosure, optionally, the request information is received through either of the following messages:

an RRC connection resume message; and
another downlink RRC message used together with the RRC connection resume message.

Optionally, a measurement type of a measurement result requested in the request information includes at least one of the following:

per-cell, per-beam, and a specified RAT.

Optionally, the early measurement information is sent through either of the following messages:

an RRC connection resume complete message; and
another uplink RRC message used together with the RRC connection resume complete message.

Optionally, the early measurement information is indication information, and the indication information is used to indicate:

no available measurement result.

Optionally, the indication information is further used to indicate:

a measurement type with respect to an unavailable measurement result; where the measurement type includes at least one of the following:

per-cell, per-beam, and a specified RAT.

Optionally, the early measurement information includes at least one of the following:

an available per-cell measurement result;
an available per-beam measurement result;
an available measurement result for a specified RAT;
an available per-cell measurement result for a specified RAT; or
an available per-beam measurement result for a specified RAT.

Optionally, the RRC connection resume complete message does not include information related to the early measurement result, and the RRC connection resume complete message is used to implicitly indicate no available measurement result.

Figure 5:
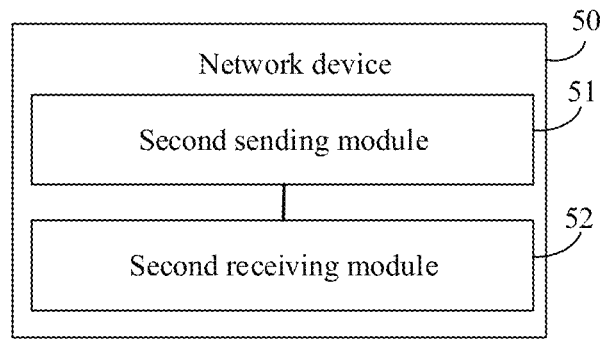
FIG. 5 is a first schematic structural diagram of a network device according to an embodiment of this disclosure.

Referring to FIG. 5, FIG. 5 is a schematic structural diagram of a network device according to an embodiment of this disclosure. As shown in FIG. 5, the network device 50 includes:

a second sending module 51, configured to send request information to a terminal; and a second receiving module 52, configured to receive early measurement information from the terminal, where the request information is used to request the terminal to feed back an early measurement result; and the request information is sent and the early measurement information is received during an RRC connection resume procedure.

In this embodiment, reporting of the measurement result may be completed during an RRC connection resume procedure, thereby further advancing a measurement reporting occasion of the terminal compared with the related art, and meeting a requirement of quickly activating related configuration by the network device.

Optionally, the request information is sent through either of the following messages:

an RRC connection resume message; and another downlink RRC message used together with the RRC connection resume message.

Optionally, a measurement type of a measurement result requested in the request information includes at least one of the following:

per-cell, per-beam, and a specified RAT.

Optionally, the early measurement information is received through either of the following messages:

an RRC connection resume complete message; and another uplink RRC message used together with the RRC connection resume complete message.

Optionally, the early measurement information is indication information, and the indication information is used to indicate:

no available measurement result.

Optionally, the indication information is further used to indicate: a measurement type with respect to an unavailable measurement result; where the measurement type includes at least one of the following:

per-cell, per-beam, and a specified RAT.

Optionally, the early measurement information includes at least one of the following:

an available per-cell measurement result;

an available per-beam measurement result;

an available measurement result for a specified RAT;

an available per-cell measurement result for a specified RAT; or an available per-beam measurement result for a specified RAT.

Optionally, the RRC connection resume complete message does not include information related to the early measurement result, and the RRC connection resume complete message is used to implicitly indicate no available measurement result.

An embodiment of this disclosure further provides a terminal, including a processor, a memory, and a program stored in the memory and capable of running on the processor. When the program is executed by the processor, the processes of the foregoing embodiment of the information sending method are implemented, with the same technical effect achieved. To avoid repetition, details are not described herein again.

Figure 6:
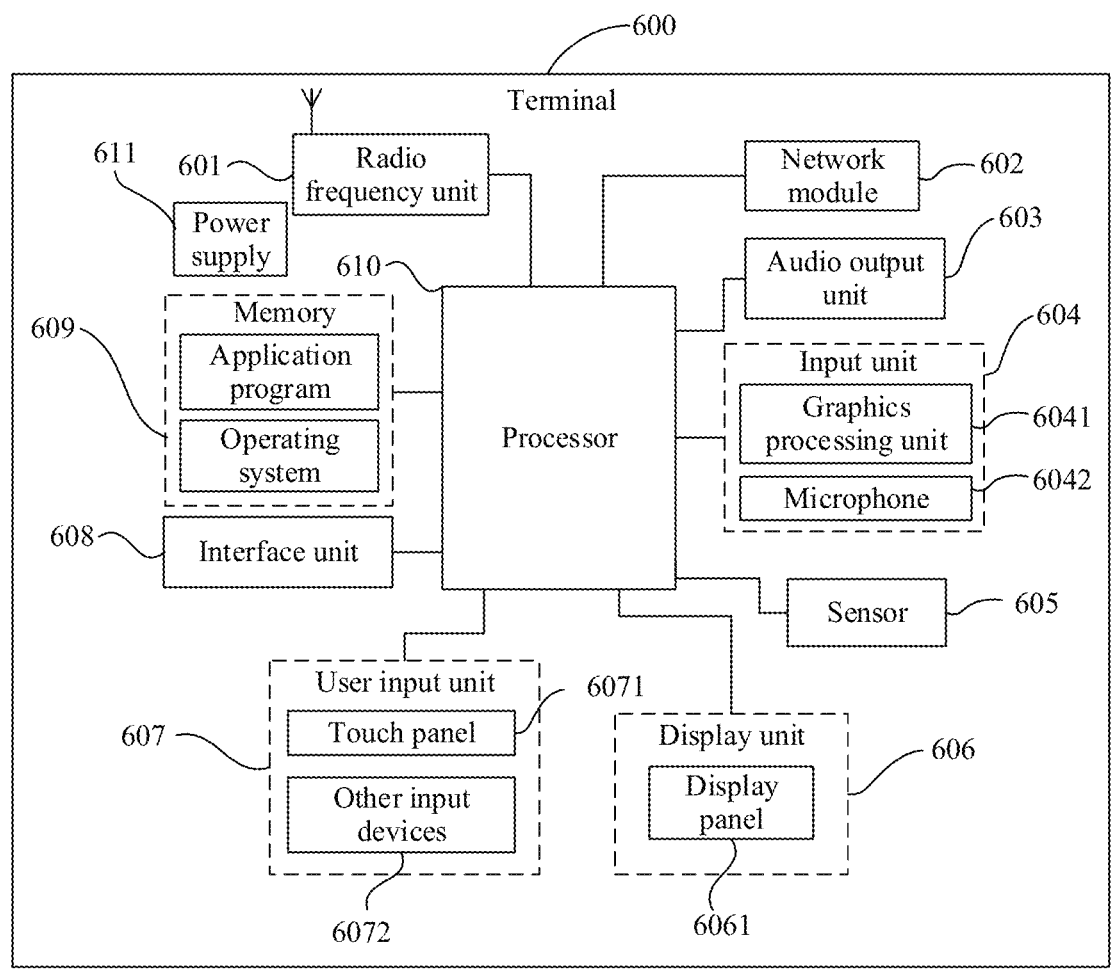
FIG. 6 is a second schematic structural diagram of a terminal according to an embodiment of this disclosure.

Specifically, FIG. 6 is a schematic diagram of a hardware structure of a terminal for implementing the embodiments of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 601 is configured to: receive request information from a network device; and send early measurement information to the network device, where the request information is used to request the terminal to feed back an early measurement result; and the request information is received and the early measurement information is sent during an RRC connection resume procedure.

The terminal 600 in this embodiment of this disclosure can implement the processes implemented in the method embodiment shown in FIG. 1, with the same beneficial effects achieved. To avoid repetition, details are not described herein again.

It should be understood that in an embodiment of this disclosure, the radio frequency unit 601 may be configured to: receive and send signals in an information receiving/sending process or a call process; and specifically, after receiving downlink data from a base station, send the downlink information to the processor 610 for processing, and in addition, send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides wireless broadband Internet access for a user by using the network module 602, for example, helping the user to send and receive e-mails, to browse web pages, and to access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a telephone receiver, and the like.

The input unit 604 is configured to receive an audio or video signal. The input unit 604 may include a graphics processing unit (Graphics Processing Unit, GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The terminal 600 further includes at least one sensor 605, for example, an optical sensor, a motion sensor, and other sensors. Specifically, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include a display panel 6061, and the display panel 6061 may be configured in the form of a liquid crystal display (Liquid Crystal Display, LCD), an organic light-emitting diode (Organic Light-Emitting Diode, OLED), or the like.

The user input unit 607 may be configured to receive input digit or character information, and generate a key signal input related to a user setting and function control of the terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After detecting a touch operation on or near the touch panel 6071, the touch panel 6071 transmits information about the touch operation to the processor 610 for the processor 610 to determine a touch event type, and then the processor 610 provides a corresponding visual output on the display panel 6061 based on the touch event type. In FIG. 6, the touch panel 6071 and the display panel 6061 serve as two separate components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the terminal, connects various parts of the entire terminal by using various interfaces and lines, and executes various functions and data processing of the terminal by running or executing a software program and/or a module stored in the memory 609 and invoking data stored in the memory 609, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 600 may further include the power supply 611 (for example, a battery) supplying power to all components. Optionally, the power supply 611 may be logically connected to the processor 610 through a power management system, to implement functions such as charge management, discharge management, and power consumption management by using the power management system.

In addition, the terminal 600 may further include some functional modules that are not shown. Details are not described herein.

An embodiment of this disclosure further provides a network device, including a processor, a memory, and a program stored in the memory and capable of running on the processor. When the program is executed by the processor, the processes of the foregoing embodiment of the information receiving method are implemented, with the same technical effect achieved. To avoid repetition, details are not described herein again.

Figure 7:
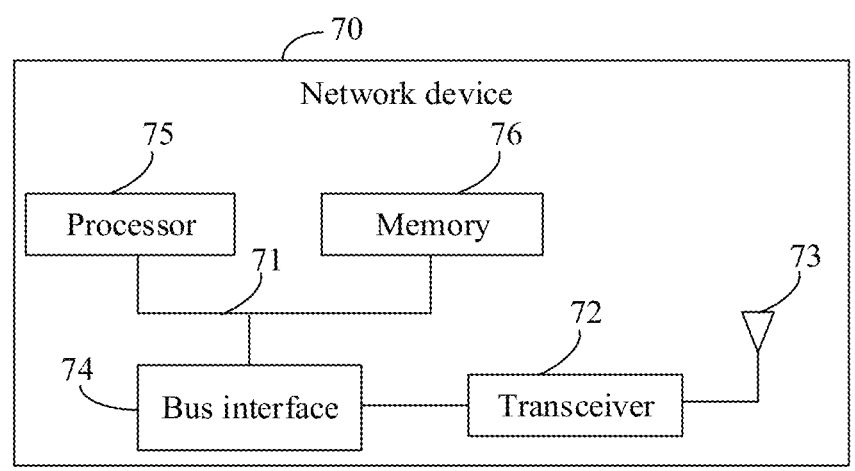
FIG. 7 is a second schematic structural diagram of a network device according to an embodiment of this disclosure.

Specifically, FIG. 7 is a schematic diagram of a hardware structure of a network device for implementing the embodiments of this disclosure. The network device 70 includes but is not limited to: a bus 71, a transceiver 72, an antenna 73, a bus interface 74, a processor 75, and a memory 76.

In this embodiment of this disclosure, the network device 70 further includes a program stored in the memory 76 and capable of running on the processor 75. When the program is executed by the processor 75, the following steps are implemented:

sending request information to a terminal; and
receiving early measurement information from the terminal, where
the request information is used to request the terminal to feed back an early measurement result; and the request information is sent and the early measurement information is received during an RRC connection resume procedure.

The transceiver 72 is configured to receive and send data under control of the processor 75.

The network device 70 in this embodiment of this disclosure can implement the processes implemented in the method embodiment shown in FIG. 2, with the same beneficial effects achieved. To avoid repetition, details are not described herein again.

In FIG. 7, in a bus architecture (represented by the bus 71), the bus 71 may include any quantity of interconnected buses and bridges, and the bus 71 connects various circuits including one or more processors represented by the processor 75 and a memory represented by the memory 76. The bus 71 may further interconnect various other circuits such as a peripheral device, a voltage regulator, and a power management circuit. These are all well known in the art, and therefore are not further described in this specification. The bus interface 74 provides an interface between the bus 71 and the transceiver 72. The transceiver 72 may be one or more elements, for example, a plurality of receivers and transmitters, and provide units for communicating with various other apparatuses on a transmission medium. Data processed by the processor 75 is transmitted on a wireless medium through the antenna 73, and further, the antenna 73 also receives data and transmits the data to the processor 75.

The processor 75 is responsible for managing the bus 71 and general processing, and can also provide various functions, including timing, a peripheral interface, voltage regulation, power management, and other control functions. In addition, the memory 76 may be configured to store data used by the processor 75 to perform an operation.

Optionally, the processor 75 may be a general-purpose processor, a digital signal processor (Digital Signal Processor, DSP), an application specific integrated circuit (Application Specific Integrated Circuit, ASIC), a field programmable gate array (Field Programmable Gate Array, FPGA), a complex programmable logic device (Complex Programmable Logic Device, CPLD) or another programmable logic device, a discrete gate or transistor logic device, or a discrete hardware component.

An embodiment of this disclosure further provides a computer-readable storage medium, where a program is stored in the computer-readable storage medium. When the program is executed by a processor, the processes in the foregoing embodiment of the information sending method applied to the terminal or the processes in the foregoing embodiment of the information receiving method applied to the network device are implemented, with the same technical effects achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, "and/or" used in this application indicates at least one of the connected objects. For example, "A and/or B and/or C" represents the following cases: only A; only B; only C; both A and B; both B and C; both A and C; and all A, B, and C. Similarly, in the specification and claims, the use of "at least one of A and B" should be interpreted as: "A alone, B alone, or both A and B".

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, persons of ordinary skill in the art can still derive many variations without departing from the essence of this disclosure and the protection scope of the claims. All these variations shall fall within the protection of this disclosure.

What is claimed is:

1. An information sending method, performed by a terminal and comprising:
receiving request information from a network device; and
sending early measurement information to the network device, wherein
the request information is used to request the terminal to feedback an early measurement result; and
the request information is received and the early measurement information is sent during a radio resource control (RRC) connection resume procedure;
wherein the request information is received through either of the following messages:
an RRC connection resume message; and
another downlink RRC message used together with the RRC connection resume message;

wherein the early measurement information is sent through either of the following messages:
an RRC connection resume complete message; and
another uplink RRC message used together with the RRC connection resume complete message.

2. The method according to claim 1, wherein a measurement type of a measurement result requested in the request information comprises at least one of the following:
per-cell, per-beam, and a specified radio access type (RAT).

3. The method according to claim 1, wherein the early measurement information is indication information, and the indication information is used to indicate:
no available measurement result.

4. The method according to claim 3, wherein the indication information is further used to indicate:
a measurement type with respect to an unavailable measurement result; wherein
the measurement type comprises at least one of the following:
per-cell, per-beam, and a specified RAT.

5. The method according to claim 1, wherein the early measurement information comprises at least one of the following:
an available per-cell measurement result;
an available per-beam measurement result;
an available measurement result for a specified RAT;
an available per-cell measurement result for a specified RAT; or
an available per-beam measurement result for a specified RAT.

6. The method according to claim 1, wherein the RRC connection resume complete message does not comprise information related to the early measurement result, and the RRC connection resume complete message is used to implicitly indicate no available measurement result.

7. An information receiving method, performed by a network device and comprising:
sending request information to a terminal; and
receiving early measurement information from the terminal, wherein
the request information is used to request the terminal to feed back an early measurement result; and the request information is sent and the early measurement information is received during an RRC connection resume procedure;
wherein the request information is received through either of the following messages:
an RRC connection resume message; and
another downlink RRC message used together with the RRC connection resume message;
wherein the early measurement information is sent through either of the following messages:
an RRC connection resume complete message; and
another uplink RRC message used together with the RRC connection resume complete message.

8. The method according to claim 7, wherein a measurement type of a measurement result requested in the request information comprises at least one of the following:
per-cell, per-beam, and a specified RAT.

9. The method according to claim 7, wherein the early measurement information is indication information, and the indication information is used to indicate:
no available measurement result.

10. The method according to claim 9, wherein the indication information is further used to indicate: a measurement type with respect to an unavailable measurement result; wherein
the measurement type comprises at least one of the following:
per-cell, per-beam, and a specified RAT.

11. The method according to claim 7, wherein the early measurement information comprises at least one of the following:
an available per-cell measurement result;
an available per-beam measurement result;
an available measurement result for a specified RAT;
an available per-cell measurement result for a specified RAT; or
an available per-beam measurement result for a specified RAT.

12. The method according to claim 7, wherein the RRC connection resume complete message does not comprise information related to the early measurement result, and the RRC connection resume complete message is used to implicitly indicate no available measurement result.

13. A terminal, comprising: a memory, a processor, and a program stored in the memory and capable of running on the processor, wherein when executing the program, the processor is configured to:
receive request information from a network device; and
send early measurement information to the network device, wherein
the request information is used to request the terminal to feed back an early measurement result; and the request information is received and the early measurement information is sent during an RRC connection resume procedure;
wherein the request information is received through either of the following messages:
an RRC connection resume message; and
another downlink RRC message used together with the RRC connection resume message;
wherein the early measurement information is sent through either of the following messages:
an RRC connection resume complete message; and
another uplink RRC message used together with the RRC connection resume complete message.

14. A network device, comprising a memory, a processor, and a program stored in the memory and capable of running on the processor, wherein when executing the program, the processor is configured to implement steps of the information receiving method according to claim 7.

15. A non-transitory computer-readable storage medium, storing a program, wherein the program, when executed, causes a processor to implement steps of the information sending method according to claim 1.

* * * * *